United States Patent [19]

Kurokawa et al.

[11] Patent Number: 4,876,306
[45] Date of Patent: Oct. 24, 1989

[54] PROCESS FOR PREPARING A THERMOPLASTIC RESIN

[75] Inventors: Satoshi Kurokawa, Iwakuni; Suehiro Tayama, Ohtake; Fumio Sato, Abiko, all of Japan

[73] Assignee: Mitsubishi Rayon Company, Ltd., Tokyo, Japan

[21] Appl. No.: 167,953

[22] Filed: Mar. 14, 1988

[30] Foreign Application Priority Data

Mar. 16, 1987 [JP] Japan ................... 62-60484

[51] Int. Cl.$^4$ ............ C08K 3/30; C08F 2/00
[52] U.S. Cl. ..................... 524/423; 526/193
[58] Field of Search ............ 526/193; 524/423

[56] References Cited

U.S. PATENT DOCUMENTS

| | | | |
|---|---|---|---|
| 4,104,465 | 8/1978 | Halasa | 526/174 |
| 4,169,086 | 9/1979 | Nolken | 526/193 |
| 4,293,665 | 10/1981 | Zalucha et al. | 526/193 |
| 4,433,103 | 2/1984 | Kamata et al. | 525/81 |
| 4,595,728 | 6/1986 | Nakai et al. | 525/81 |
| 4,727,193 | 2/1988 | Dackner | 568/12 |

FOREIGN PATENT DOCUMENTS

| | | | |
|---|---|---|---|
| 111541 | 8/1979 | Japan . | |
| 57-78937 | 5/1982 | Japan | 526/193 |
| 108629 | 5/1986 | Japan . | |

*Primary Examiner*—Joseph L. Schofer
*Assistant Examiner*—N. Sarofim
*Attorney, Agent, or Firm*—Cushman, Darby & Cushman

[57] ABSTRACT

A process for preparing a thermoplastic resin, which comprises polymerizing a monomer mixture containing at least 80% by weight of at least one member selected from the group consisting of an alkyl methacrylate, an alkyl acrylate, an aromatic vinyl compound, acrylonitrile, methacrylonitrile and butadiene by using as an emulsifier a compound having a group of the formula —$PO_3M_2$ or —$PO_2M$ wherein M is an alkali metal or an alkaline earth metal, to form a latex, and contacting the latex with an aqueous magnesium sulfate solution having a concentration of from 0.1 to 30% by weight.

6 Claims, No Drawings

PROCESS FOR PREPARING A THERMOPLASTIC RESIN

The present invention relates to a process for preparing a thermoplastic resin. More particularly, it relates to a process for preparing a thermoplastic resin which has excellent heat decomposition resistance and is hardly colored by heat and which exhibits no substantial corrosive action to metal during the molding operation.

A polymer recovered from a latex obtained by emulsion polymerization may sometimes be added as a modifier to an ABS resin, a high impact styrene resin, a vinyl chloride resin or a methacrylate resin. It is well known that the impact resistance and thermal properties as well as the moldability may be improved by the addition of a polymer recovered from a latex obtained by emulsion polymerization to such a resin.

Various methods are known for the recovery of the polymer from the latex produced by emulsion polymerization, as follows.

(a) A method wherein an inorganic salt having a monovalent cation and a monovalent or bivalent anion, such as NaCl or $Na_2SO_4$, is added.

(b) A method wherein an inorganic salt having a chlorine ion is added.

(c) A method wherein an inorganic salt having an alminum ion is added.

(d) A method wherein an acid such as sulfuric acid is added.

However, the above methods had various problems, Namely, in the method (a) wherein an inorganic salt having a monovalent cation and a monovalent or bivalent anion is added, it is required to use a large amount of the inorganic salt in order to recover the polymer under a stabilized condition. Further, when the obtained polymer is added to e.g. a methacrylate resin, hot water blushing tends to occur. In the method (b) wherein an inorganic salt having a chlorine ion is added, the resulting polymer is corrosive to metal, which creates a problem in the production line. In the method (c) wherein an inorganic salt having an alminum ion is added, the recovered polymer tends to have a color. The same is true in the case where an inorganic salt having a nitric acid group is used. In the method (d) wherein sulfuric acid is added, the coloring of the recovered polymer is little, but an ABS resin having this polymer added tends to deposit in a substantial amount to the mold during the molding operation, whereby the surface gloss deteriorates, and the shaped product tends to have a poor outer appearance.

As a method for recovering from a latex a polymer having a little corrosive action against metal, which can be recovered by an addition of a relatively small amount of a recovering agent and which, when added to another resin, does not impair various desirable properties of the resulting resin composition, Japanese Unexamined Patent Publication No. 108629/1986 discloses a method for recovering a polymer by contacting with an aqueous magnesium sulfate solution a latex obtained by polymerization by using an emulsifier having a group of the formula $-OSO_3M$, $-COOM$, or $-SO_3M$ wherein M is K or Na. However, this method is also not fully satisfactory with respect to the coloring of the polymer by heat, the heat decomposition resistance of the polymer and the corrosive property of the polymer against metal during the molding operation, although the intended object may be accomplished to some extent.

Under these circumstances, the present inventors have conducted extensive research and as a result, have found it possible to obtain a polymer free from the above-mentioned problems by contacting a polymer latex having a specific composition polymerized by using an emulsifier having a specific structure, with an aqueous magnesium sulfate solution having a concentration within a specific range. The present invention has been accomplished on the basis of this discovery.

The present invention provides a process for preparing a thermoplastic resin, which comprises polymerizing a monomer mixture containing at least 80% by weight of at least one member selected from the group consisting of an alkyl methacrylate, an alkyl acrylate, an aromatic vinyl compound, acrylonitrile, methacrylonitrile and butadiene by using as an emulsifier a compound having a group of the formula $-PO_3M_2$ or $-PO_2M$ wherein M is an alkali metal or an alkaline earth metal, to form a latex, and contacting the latex with an aqueous magnesium sulfate solution having a concentration of from 0.1 to 30% by weight.

Now, the present invention will be described in detail with reference to the preferred embodiments.

According to the process of the present invention wherein a latex prepared by using an emulsifier having the specific structure is contacted with magnesium sulfate, it is possible to recover the polymer by an addition of a relatively small amount of a recovering agent, by virtue of the action of magnesium ions as bivalent cations, and the amount of magnesium sulfate remaining in the recovered polymer is extremely small (even if a trace amount of magnesium ions remain, they are believed to react with anion groups of the emulsifier to form a magnesium salt, and in general a magnesium salt is excellent in the heat resistance as is evident from the fact that e.g. magnesium stearate is useful by itself as a heat stabilizer, and it is believed that the magnesium salt itself does not adversely affect the polymer). Thus, the recovered polymer has little corrosive action against metal and the degree of coloring is low. Accordingly, it is thereby possible to solve the problems such as the corrosion of an apparatus during the solidification step and the corrosion of the molding apparatus and the coloring of the molded product when used as a molding material.

The emulsifier used in the present invention is a compound having a group of $-PO_3M_2$ or $-PO_2M$ wherein M is an alkali metal or an alkaline earth metal. Specifically, it may be a phosphate of the formula:

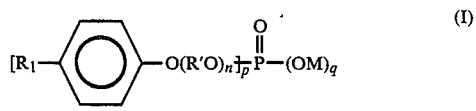

wherein $R_1$ is an alkyl or alkenyl group having from 4 to 8 carbon atoms, R' is an ethylene group or a propylene group, M is an alkali metal or an alkaline earth metal, n is from 4 to 8, $p+q=3$, and p is 1 or 2, or a mixture thereof, or a phosphate of the formula:

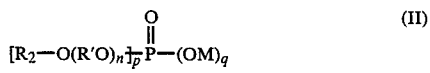

wherein $R_2$ is an alkyl or alkenyl group having from 4 to 8 carbon atoms, R' is an ethylene group or a propylene group, M is an alkali metal or an alkaline earth metal, n is from 4 to 8, p+q=3, and p is 1 or 2, or a mixture thereof. Preferably, it is an alkali metal salt or an alkaline earth metal salt of mono-n-butylphenylpentaoxyethylene phosphate, di-n-butylphenylpentaoxyethylene phosphate, mono-n-pentylphenylhexaoxyethylene phosphate, di-n-pentylphenylhexaoxyethylene phosphate, mono-n-heptylphenylpentaoxyethylene phosphate, di-n-heptylphenylpentaoxyethylene phosphate, mono-n-pentyloxyheptaoxyethylene phosphate, di-n-pentyloxyheptaoxyethylene phosphate, mono-n-hexyloxypentaoxyethylene phosphate or di-n-hexyloxypentaoxyethylene phosphate. The alkali metal is preferably sodium or potassium, and the alkaline earth metal is preferably calcium or barium. These phosphates may be used alone or in combination as a mixture of a monoester and a diester.

The amount of the phosphate to be used varied depending upon the type of the monomer to be polymerized and the polymerization conditions and can not generally be defined. However, in the present invention, it is usually within a range of from 0.1 to 10 parts by weight, preferably from 0.5 to 5 parts by weight, relative to 100 parts by weight of the monomer.

The monomer mixture to be used in the present invention can not generally be determined since the optimum composition varies depending upon the type of purpose of the resin to which the resulting polymer is to be added. However, it contains at least 80% by weight of at least one monomer selected from the group consisting of an alkyl methacrylate, an alkyl acrylate, an aromatic vinyl compound, acrylonitrile, methacrylonitrile and butadiene. As the alkyl methacrylate, methyl methacrylate, ethyl methacrylate or cyclohexyl methacrylate may be used. As the alkyl acrylate, methylacrylate, ethylacrylate, butylacrylate or 2-ethylhexyl acrylate may be used. As the armoatic vinyl compound, styrene, vinyl toluene or α-methylstyrene may be employed. As other units constituting less than 20% by weight together with at least 80% by weight of the above-mentioned units, methacrylic acid, acrylic acid and hydroxyethyl methacrylate as well as poly functional monomers such as ethylene glycol dimethacrylate, divinyl benzene, 1,4-butylene glycol diacrylate, allyl methacrylate, triallyl cyanurate, allyl cinnamate, allyl sorbate, diallyl maleate, diallyl phthalate, triallyl trimellitate and diallyl fumarate may be mentioned.

The emulsion polymerization can be conducted in the presence of the above-mentioned emulsifier with an optional monomer composition within the above-mentioned range for forming the polymer-constituting units.

The present invention is effectively utilized in the field where a copolymer is prepared by emulsion polymerization by polymerizing at least one monomer selected from the group consisting of an alkyl methacrylate, an alkyl acrylate, an aromatic vinyl compound acrylonitrile and methacrylonitrile in the presence of an elastmeric polymer obtained by copolymerizing at least one monomer selected from the group consisting of an alkyl acrylate, an aromatic vinyl compound and butadiene as a latex.

Further, the present invention is effectively used in the field where an impact resistance modifier for a methacrylate resin having a two step internal structure is produced by emulsion polymerization by polymerizing a monomer mixture containing at least 80% by weight of methyl methacrylate in the presence of an elastmeric polymer obtained by copolymerizing a monomer mixture composed of butyl acrylate, styrene and a poly functional monomer, as a latex.

There is no particular restriction as to the initiation of the polymerization. However, as the radical polymerization initiator, there may be employed a peroxide such as benzoylperoxide, cumenehydroperxide or hydrogenperoxide, an azo compound such as azobisisobutylonitrile, a persulfate compound such as ammonium persulfate or potassium persulfate, a perchloric acid compound, a perboric acid compound or a redox initiator composed of a combination of a peroxide and a reducing sulfoxy compound.

The above-mentioned monomers and the polymerization initiator may be added by an optional conventional method such as a method of adding them at once, a method of adding them portionwise, a method of adding them continuously or a monomer addition method or an emulsion addition method.

Further, in order to conduct the reaction smoothly, the reaction system may be substituted with nitrogen, the reaction system may be heated after the completion of the reaction in order to remove the remaining monomers, or a special catalyst may be added.

The concentration of the aqueous solution sulfate magnesium used for the operation of recovering the polymer from the polymer latex is usually from 0.1 to 30% by weight, preferably from 1 to 15% by weight, more preferably from 1 to 3% by weight. If the concentration is less than 0.1% by weight, the recovery of the polymer may not be conducted under a stabilized condition in some cases. On the other hand, if the concentration exceeds 30% by weight, the costs increase, and the amount remaining in the recovered polymer tends to increase, such being undesirable.

Magnesium sulfate to be used for the recovery is preferably used by itself, but if necessary, it may be used in combination with other substances such as other inorganic salts or acids.

The recovery operation may be conducted continuously by reacting the polymer latex and the aqueous magnesium sulfate solution, which were separately prepared. On the other hand, the recovery operation may be conducted in a batch system.

There is no particular restriction as to the temperature for the contact. However, the temperature is preferably within a range of from 30° to 100° C.

The polymer latex and the aqueous magnesium sulfate solution are contacted, and the coagulated slurry-like polymer is washed with from 1 to 100 times of water and dried at a temperature of from 50° to 100° C. The powdery polymer thus obtained may be subjected by itself to molding, or may be used as a modifier for other resins.

Now, the present invention will be described in further detail with reference to Examples. However, it should be understood that the present invention is by no means restricted to such specific Examples.

In the Examples, "parts" means "parts by weight", and "%" means "% by weight". The evaluation in the Examples was made by subjecting the obtained polymers to injection molding under the following conditions:

Injection molding machine: Automatic injection molding machine Model V-17-65, manufactured by Kabushiki Kaisha Nippon Seikosho Injection molding conditions: Cylinder temperature of 250° C., and injection pressure of 700 kg/cm$^2$ Size of test piece: 110 mm×110 mm×2 mm (thickness) 70 mm×12.5 mm×6.2 mm (thickness)

(1) Izod impact strength was measured in accordance with ASTM D-256.

(2) The degree of coloring was visually evaluated.
O: No coloring
Δ: Slight yellowing
X: Substantial yellowing (3) The corrosive action against metal was evaluated by placing in extruded pellets, a usual soft steel polished to have a specular surface and inspecting the surface.
O: No change on the surface
Δ: The metallic gloss of the surface slightly lowered.
X: The metallic gloss of the surface was lost.

(4) The hot water blushing was evaluated by immersing an injection molded plate in hot water of 95° C. for 120 minutes and then inspecting the surface.
O: No change
Δ: Slight blushing
X: Substantial blushing (5) The deposition to the mold was evaluated by the light reflectance ($\alpha = 60°$) of the molded plate obtained by the 50th shot relative to the reflectance of the molded plate obtained by the 3rd shot after washing the mold surface for injection molding being 100.

(6) The heat decomposition was determined by heating extruded pellets at 270° C. for 60 minutes and measuring the weight maintaining rate.

(7) YI values were measured in accordance with ASTM D-1925.

EXAMPLE 1

(A) Into a stainless steel reactor having an internal capacity of 50 liters, starting materials identified in the following (a) were charged in the respective proportions, and nitrogen was blown in under stirring to substantially eliminate the influence of oxygen. Then, the temperature was raised to 70° C. and starting materials identified in the following (b) were added thereto. The polymerization was conducted for 2 hours.

| (a) Starting materials | | |
|---|---|---|
| Deionized water: | | 500 parts |
| 1:1 mixture of sodium mono-n-pentylphenylhexaoxyethylene phosphate and sodium di-n-pentylphenylhexaoxyethylene phosphate (hereinafter referred to simply as Emulsifier A): | | |
| | | 1.2 parts |
| Sodium carbonate: | | 0.05 part |
| Methyl methacrylate: | 97% | |
| Methyl acrylate: | 1% | 15 parts |
| 1,3-butylene dimethacrylate: | 2% | |
| (b) Starting materials | | |
| Deionized water: | | 10 parts |
| Potassium persulfate: | | 0.3 part |

The polymerization degree of this latex was at least 98.5%, and the particle size was 0.15 μm.

(B) Into the above-reactor containing the latex in an amount corresponding to 15 parts of the solid content wherein the polymerization in step (A) was substantially completed, 0.32 parts of formaldehyde sodium sulfoxylate dihydrate (hereinafter referred to as Rongalit), 0.3 part of Emulsifier A and 10 parts of deionized water were added, and the temperature was raised to 80° C. Then, a mixture obtained by adding 0.32 part of t-butylhydroperoxide to 85 parts of an acrylate monomer mixture having the following composition, was continuously added thereto over a period of 150 minutes. After completion of the addition, the polymerization was continued for further 3 hours.

| Butyl acrylate: | 80% |
|---|---|
| Styrene: | 18.5% |
| allyl cinnamate: | 0.8% |
| 1,3-Butylene dimethacrylate: | 0.6% |

The polymerization degrees of butyl acrylate and styrene of the obtained latex were at lesat 98% and 99.5%, respectively, and the particle size was from 0.26 to 0.28 μm.

(C) Into the above reactor containing a latex corresponding to 100 parts of the solid content of a multi layered acrylate elastomer obtained by the above polymerization, 0.3 part of Emulsifier A and 10 parts of deionized water were added, and the mixture was stirred. Then, the following monomer mixture (C) was continuously added thereto over a period of 150 minutes. Then, the polymerization was continued for further one hour to obtain a multi layered acrylate elastomer in a latex form. The polymerization degree of monomer mixture (C) was at least 99.5%.

| Methyl methacrylate: | 96% | |
|---|---|---|
| Methyl acrylate: | 4% | 50 parts |
| n-Octylmercaptan: | 0.3% | |
| t-Butylhydroperoxide: | | 0.15 part |

This latex was coagulated, washed and dried by a method as described hereinbelow to obtain a multi layered acrylate elastomer in a powder form.

Namely, into a stainless steel container, 1400 parts of a 1.8% magnesium sulfate aqueous solution was charged as a recovering agent and heated under stirring to 80° C. Then, 700 parts of the latex prepared as above was continuously added thereto over a period of 20 minutes, and then the internal temperature was raised to 95° C. and maintained at the same temperature for 5 minutes. The mixture was cooled to room temperature, and then the polymer was collected by filtration and washed with deionized water to obtain a white creamy polymer, which was dried at 70° C. for 24 hours to obtain the polymer as a white powder.

Then, a mixture of 1875 g of this powder and 3125 g of a methacrylate resin (Acrypet VH, manufactured by Mitsubishi Rayon Company Limited) was melted, kneaded and pelletized by using a screw type extruder having an outer diameter of 40 mm (P-40-26AB-V Model, manufactured by Kabushiki Kaisha Nihon Seikosho, L/D=26) at a cylinder temperature of from 200° to 260° C. and a die temperature of 250° C., to obtain an impact resistant methacrylate resin composition containing 25% of the multi layered acrylate elastomer. The results of evaluation are shown in Table 1.

EXAMPLE 2 and COMPARATIVE EXAMPLES 1 to 3

The experiments were conducted in the same manner as in Example 1 except that the 1.8% magnesium sulfate aqueous solution used as the recovering agent in Example 1 was changed as shown in Table 1. The results are shown in Table 1.

REFERENCE EXAMPLE

A commercially available methacrylate resin (Acrypet VH, manufactured by Mitsubishi Rayon Company Limited) was molded in the same manner as in Example 1. The results are shown in Table 1.

(C) Then, a mixture (a) having the following composition was introduced into the above reactor. Fifteen minutes later, a mixture (b) having the following composition preliminarily substituted by nitrogen was dropwise added thereto over a period of 90 minutes. Then, the polymerization was continued for further one hour

TABLE 1

| | Recovering agent | | Izod impact strength (kg · cm/cm$^2$) | Coloring degree | Corrosive action against metal | Hot water blushing | Deposition to mold |
|---|---|---|---|---|---|---|---|
| | Name | Concentration in aqueous solution (%) | | | | | |
| Example 1 | Magnesium sulfate | 1.8 | 5.8 | ◯ | ◯ | ◯ | 99 |
| Example 2 | " | 1.5 | 5.8 | ◯ | ◯ | ◯ | 99 |
| Comparative Example 1 | Sodium sulfate | 5 | 5.8 | ◯ | ◯ | X | 95 |
| Comparative Example 2 | Alminum chloride | 2 | 5.8 | △ | X | △ | 95 |
| Comparative Example 3 | Calcium nitrate | 3 | 5.8 | X | △ | △ | 96 |
| Reference Example | — | — | 1.5 | ◯ | ◯ | ◯ | 100 |

EXAMPLE 3

| (A) Butyl acrylate: | 81% | } 50 parts |
|---|---|---|
| styrene: | 19% | |
| Allyl methacrylate: | | 0.45 part |
| t-Butylhydroperoxide: | | 0.15 part |
| Sodium carbonate: | | 0.05 part |
| 1:1 mixture of sodium mono-n-butylphenyl-pentaoxyethylene phosphate and sodium di-n-butylphenylpentaoxyethylene phosphate (hereinafter referred to as Emulsifier B): | | 0.12 part |
| Deionized water: | | 300 parts |

Oxygen contained in the mixture having the above composition was substituted by nitrogen, and the mixture was charged into a 40 liter autoclave and heated. When the internal temperature reached 60° C., a mixture having the following composition was introduced into the system. The temperature was raised to 80° C., and the polymerization was conducted for one hour. The polymerization degree of the latex thereby obtained was at least 99%.

| Deionized water: | 5 parts |
|---|---|
| Rongalit: | 0.48 part |
| Ferrous sulfate: | 0.4 × 10$^{-6}$ part |
| Disodium ethylenediaminetetracetate: | 1.2 × 10$^{-6}$ part |

(B) Then, a mixture having the following composition preliminarily substituted by nitrogen was dropwise added over a period of one hour to the above reactor, and the polymerization was conducted for further 90 minutes. The polymerization degree of the latex thus obtained was at least 99%, and the particle size was 0.10 μm.

| Butyl acrylate: | 81% | } 5 parts |
|---|---|---|
| styrene: | 19% | |
| Allyl methacrylate: | | 0.45 part |
| t-Butylhydroperoxide: | | 0.15 part |
| Emulsifier B: | | 0.4 part | to obtain a multi layered acrylate elastomer in a latex form. The latex obtained by cooling the content of the reactor was filtered by a metal net of 100 mesh. The coagulated polymer separated by the filtration was washed with water and then dried at 70° C. for 24 hours, and the weight was measured. Further, the polymer deposited on the inner wall of the reactor was collected, dried and weighed in the same manner. The results are shown in Table 4.

On the other hand, the amounts of monomers remaining in the latex were measured by gas chromatography, whereby the polymerization degree was found to be at least 99.5%.

| (a) Deionized water: | | 5 parts |
|---|---|---|
| Rongalit: | | 0.12 part |
| (b) Methyl methacrylate: | 95% | } 60 parts |
| Methyl acrylate: | 5% | |
| n-Octylmercaptan: | | 0.25 part |
| t-Butylhydroperoxide: | | 0.15 part |
| Emulsifier B: | | 0.4 part |

This latex was coagulated, washed and dried in the same manner as in Example 1 to obtain a powder of a multi layered acrylate elastomer.

Then, a mixture of 1800 g of this powder and 2200 g of a methacrylate resin (Acrypet VH, manufactured by Mitsubishi Rayon Company Limited) was melted, kneaded and pelletized by using a screw type extruder having an outer diameter of 40 mm (P-40-26AB-V Model, manufactured by Kabushiki Kaisha Nihon Seikosho, L/D=26) at a cylinder temperature of from 200° to 260° C. and a die temperature of 250° C., to obtain an impact resistant methacrylate resin composition containing 25% of the multi layered acrylate elastomer. The results of evaluation of the resin composition thus obtained are shown in Table 2.

EXAMPLE 4 and COMPARATIVE EXAMPLES 4 to 8

The experiments were conducted in the same manner as in Example 3 except that the emulsifier and the recovering agent were changed as shown in Table 2. The results are shown in Table 2.

TABLE 2

| | Emulsifier | | Recovering agent | | Izod impact strength (kg-cm/cm²) | Total light transmittance (%) | Haze (%) | YI value | Corrosive action against metal | Deposition to mold | Heat decomposition (%) |
|---|---|---|---|---|---|---|---|---|---|---|---|
| | Name | Amount (parts) | Name | Concentration in aqueous solution (%) | | | | | | | |
| EXAMPLE 3 | Emulsifier B | 0.12 | Magnesium sulfate | 1.8 | 3.5 | 93.1 | 1.3 | 1.43 | O | 99 | 88 |
| EXAMPLE 4 | 1:1 mixture of sodium mono-n-pentyloxy-heptaoxyethylene phosphate and sodium di-n-pentyloxy heptaoxyethylene phosphate | 0.12 | " | " | 3.2 | 92.8 | 1.4 | 1.63 | O | 98 | 86 |
| COMPARATIVE EXAMPLE 4 | Sodium N—lauroyl sarcosinate | 0.10 | " | " | 3.4 | 92.0 | 1.9 | 1.82 | Δ | 96 | 71 |
| COMPARATIVE EXAMPLE 5 | Potassium palmitate | 0.20 | " | " | 3.5 | 91.8 | 2.2 | 2.54 | Δ | 95 | 75 |
| COMPARATIVE EXAMPLE 6 | Sodium dioctyl sulfosuccinate | 0.10 | " | " | 3.4 | 92.0 | 1.8 | 2.63 | Δ | 96 | 82 |
| COMPARATIVE EXAMPLE 7 | Sodium lauryl sulfate | 0.10 | " | " | 3.2 | 92.5 | 1.5 | 1.89 | Δ | 97 | 83 |
| COMPARATIVE EXAMPLE 8 | Emulsifier B | 0.12 | Calcium nitrate | 3.0 | 3.5 | 91.0 | 2.6 | 2.58 | Δ | 98 | 70 |

EXAMPLE 5

| | |
|---|---|
| (1) styrene: | 2 kg |
| 1,3-Butadiene: | 8 kg |
| Diisopropylbenzenehydroperoxide: | 20 g |
| 1:1 mixture of sodium mono-n-heptylphenylpentaoxyethylene phosphate and sodium di-n-heptylphenylpentaoxyethylene phosphate (hereinafter referred to as Emulsifier (C): | 150 g |
| Sodium pyrophosphate: | 50 g |
| Ferrous sulfate: | 0.5 g |
| Dextrose: | 30 g |
| Deionized water: | 20 kg |

Oxygen in the substances of the above proportions except for 1,3-butadiene was replaced by nitrogen so that it does not substantially affect the polymerization reaction. Then, all the substances were charged into a 40 liter autoclave, and the polymerization was conducted at 55° C. for 10 hours.

(2) To the reactor for the polymerization containing the latex polymerized in step (1) and containing 10 kg of the polymer solid content of a styrene-butadiene copolymer latex, 9 kg of deionized water, 20 g of Rongalit and 60 g of Emulsifier C were added. Then, the internal temperature was raised to 75° C., and the following materials were continuously added over a period of 90 minutes. Then, the polymerization was conducted.

| | |
|---|---|
| styrene: | 4 kg |
| Acrylonitrile: | 1 kg |
| t-Dodecylmercaptan: | 20 kg |
| Cumenehydroperoxide: | 16 g |

After completion of the addition, the polymerization was continued for further 60 minutes. The conversion of styrene and acrylonitrile was substantially 100%.

To 40 kg of the polymer latex thus obtained, 58 g of a styrene-modified phenol, 44 g of dilaurylthiodipropionate and 58 g of triphenylphosphite were added. The latex was continuously added under stirring over a period of 20 minutes under a temperature condition of 50° C. into a stainless steel container containing 80 kg of a 1.8% magnesium sulfate aqueous solution. Then, the internal temperature was raised to 90° C. and maintained at the same temperature for 5 minutes.

The mixture was cooled to room temperature and the polymer in a slurry form thus obtained, was washed, subjected to water removal and dried at 65° C. for 36 hours to obtain a white powder.

2.9 kg of this powder resin was mixed with 7.1 kg of a styrene-acrylonitrile polymer resin (Stylac 789, manufactured by Asahi Kasei K. K.), 10 g of stearic acid monoglyceride and 20 g/30 g of ultraviolet absorbers (tinubin-P/sanole LS 770, manufactured by Chibageigy/Sankyo K. K.) by a Henschel mixer having a capacity of 20 liter and then pelletized by using a twin screw extruder of 30 mm in diameter (PCM-30, manufactured by Ikegai Tekko K. K.) at a temperature of from 210° to 240° C. at a rotational speed of 250 rpm. This pelletized resin was formed into test pieces of 110×110×2 (thickness) mm and 70×12.5×6.2 (thickness) mm by a screw-type injection molding machine (Ankelberk V-17-65 Model, manufactured by Nippon Seikosho) at a cylinder temperature of 230° C. under an injection pressure (gauge pressure) of 50 kg/cm², and tested. The results of the evaluation are shown in Table 3.

TABLE 3

| | Izod impact strength (kg-cm/cm$^{-2}$) | Coloring degree | Corrosive action against metal | Deposition to mold | Heat decomposition (%) |
|---|---|---|---|---|---|
| Example 5 | 18 | ○ | ○ | 97 | 91 |

EXAMPLE 6 and COMPARATIVE EXAMPLES 9 to 13

The experiments were conducted in the same manner as in Example 5 except that the emulsifier and the recovering agent were changed to the substances and the proportions as identified in Table 4. The results are shown in Table 4.

TABLE 4

| | Emulsifier Name | Emulsifier Amount (g) | Emulsifier Name | Emulsifier Amount (g) | Recovering agent Name | Recovering agent Concentration in aqueous solution (%) | Izod impact strength (kg-cm/cm$^2$) | Coloring degree | Corrosive action against metal | Deposition to mold | Heat decomposition (%) |
|---|---|---|---|---|---|---|---|---|---|---|---|
| COMPARATIVE EXAMPLE 6 | 1:1 mixture of sodium mono-n-hexyloxy-heptaoxy-ethylene phosphate and sodium di-n-hexyloxy-heptaoxy-ethylene phosphate | 150 | Emulsifier D | 60 | Magnesium sulfate | 1.8 | 20 | ○ | ○ | 99 | 91 |
| COMPARATIVE EXAMPLE 9 | Sodium N—lauroyl sarcosine | 100 | Sodium N—lauroyl-salcosinate | 50 | " | " | 20 | △ | △ | 96 | 76 |
| COMPARATIVE EXAMPLE 10 | Potassium palmitate | 250 | — | — | " | " | 20 | △ | △ | 97 | 82 |
| COMPARATIVE EXAMPLE 11 | Sodium dioctyl sulfosuccinate | 100 | Sodium N—lauroyl-salcosinate | 50 | " | " | 19 | △ | △ | 96 | 80 |
| COMPARATIVE EXAMPLE 12 | Sodium lauryl sulfate | 100 | Sodium lauryl-sulfate | 50 | " | " | 19 | △ | △ | 96 | 88 |
| COMPARATIVE EXAMPLE 13 | Emulsifier D | 150 | Emulsifier D | 60 | Calcium nitrate | 3.0 | 19 | X | △ | 69 | 75 |

EXAMPLE 7

The polymerization was conducted in the same manner as in Example 1 (A) except that instead of methyl methacrylate, methyl acrylate and 1,3-butylene dimethacrylate used in Example 1 (a), 40% of butyl acrylate, 9.5% of styrene 49% of methyl methacrylate and 1.5% of 1,4-butanediol dimethacrylate were used. The polymerization degree of this latex was 98.8%, and the particle size was 0.14 μm.

The subsequent polymerization operation was conducted in the same manner as in Example 1 to obtain a latex of a multi layered acrylate elastomer.

This latex was solidified, washed and dried by a method as described below to obtain a powder of multi layered acrylate elastomer.

Namely, into a stainless steel container, 700 parts of a 3.0% magnesium sulfate aqueous solution was charged as a recovering agent and heated to 80° C. under stirring. Then, 700 parts of the latex prepared as above was continuously added thereto over a period of 20 minutes, and then the internal temperature was raised to 95° C. and maintained at the same temperature for 5 minutes. The mixture was cooled to room temperature, and then the polymer was collected by filtration and washed with deionized water to obtain a white creamy polymer, which was dried at 70° C. for 24 hours to obtain a polymer as a white powder.

Then, a mixture of 1875 g of this powder and 3125 g of a methacrylate resin (Acrypet VH, manufactured by Mitsubishi Rayon Company Limited) was melted, kneaded and pelletized by using a screw type extruder having an outer diameter of 40 mm (P-40-26AB-V Model, manufactured by Kabushiki Kaisha Nihon Seikosho, L/D=26) at a cylinder temperature of from 200° to 260° C. and a die temperature of 250° C., to obtain an impact resistant methacrylate resin composition containing 25% of a multi layered acrylate elastomer.

The resin composition was evaluated, whereby the Izod impact strength was found to be 5.6 kg-cm/cm$^2$. Further, the coloring degree, the corrosive action against metal and the hot water blushing were satisfactorily low. The deposition to mold was 99.

According to the process of the present invention, it is possible to prepare a thermoplastic resin which has excellent heat decomposition resistance, thus being free from coloring and which has little corrosive action against metal during the molding. Thus, the process of the present invention provides excellent industrial merits.

We claim:

1. A process for preparing a thermoplastic resin, which comprises polymerizing a monomer mixture containing at least 80% by weight of at least one member selected from the group consisting of an alkyl methacrylate, an alkyl acrylate, an aromatic vinyl compound, acrylonitrile, methacrylonitrile and butadiene by using as an emulsifier a compound having a group of the formula —$PO_3M_2$ or —$PO_2M$ wherein M is an alkali metal or an alkaline earth metal, to form a latex, and contacting the latex with an aqueous magnesium sulfate solution having a concentration of from 0.1 to 30% by weight.

2. The process for preparing a thermoplastic resin according to claim 1, wherein the emulsifier is a phosphate of the formula:

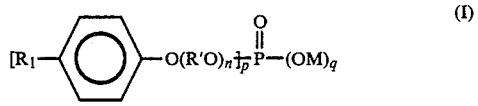

wherein $R_1$ is an alkyl or alkenyl group having from 4 to 8 carbon atoms, R' is an ethylene group or a propylene group, M is an alkali metal or an alkaline earth metal, n is from 4 to 8, p+q=3, and p is 1 or 2, or a mixture thereof.

3. The process for preparing a thermoplastic resin according to claim 1, wherein the emulsifier is a phosphate of the formula:

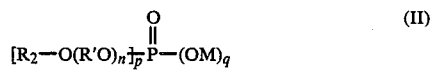

wherein $R_2$ is an alkyl or alkenyl group having from 4 to 8 carbon atoms, R' is an ethylene group or a propylene group, M is an alkali metal or an alkaline metal, n is from 4 to 8, p+q=3, and p is 1 or 2, or a mixture thereof.

4. The process for preparing a thermoplastic resin according to claim 1, wherein the emulsifier is a monopentylphenylhexaoxyethylene phosphate, a dipentylphenylhexaoxyethylene phosphate or a mixture thereof.

5. The process for preparing a thermoplastic resin according to claim 1, wherein the magnesium sulfate concentration in the magnesium sulfate aqueous solution is from 1 to 15% by weight.

6. The process for preparing a thermoplastic resin according to claim 1, wherein the magnesium sulfate concentration in the magnesium sulfate aqueous solution is from 1 to 3% by weight.

* * * * *